3,809,534
PROCESS OF MAKING INDENTATION RECOVERY POLYVINYL CHLORIDE SURFACE COVERING BY REACTING THE CELLULOSIC FELT BACKING WITH A CROSS-LINKING AGENT AND PRODUCT PRODUCED THEREBY

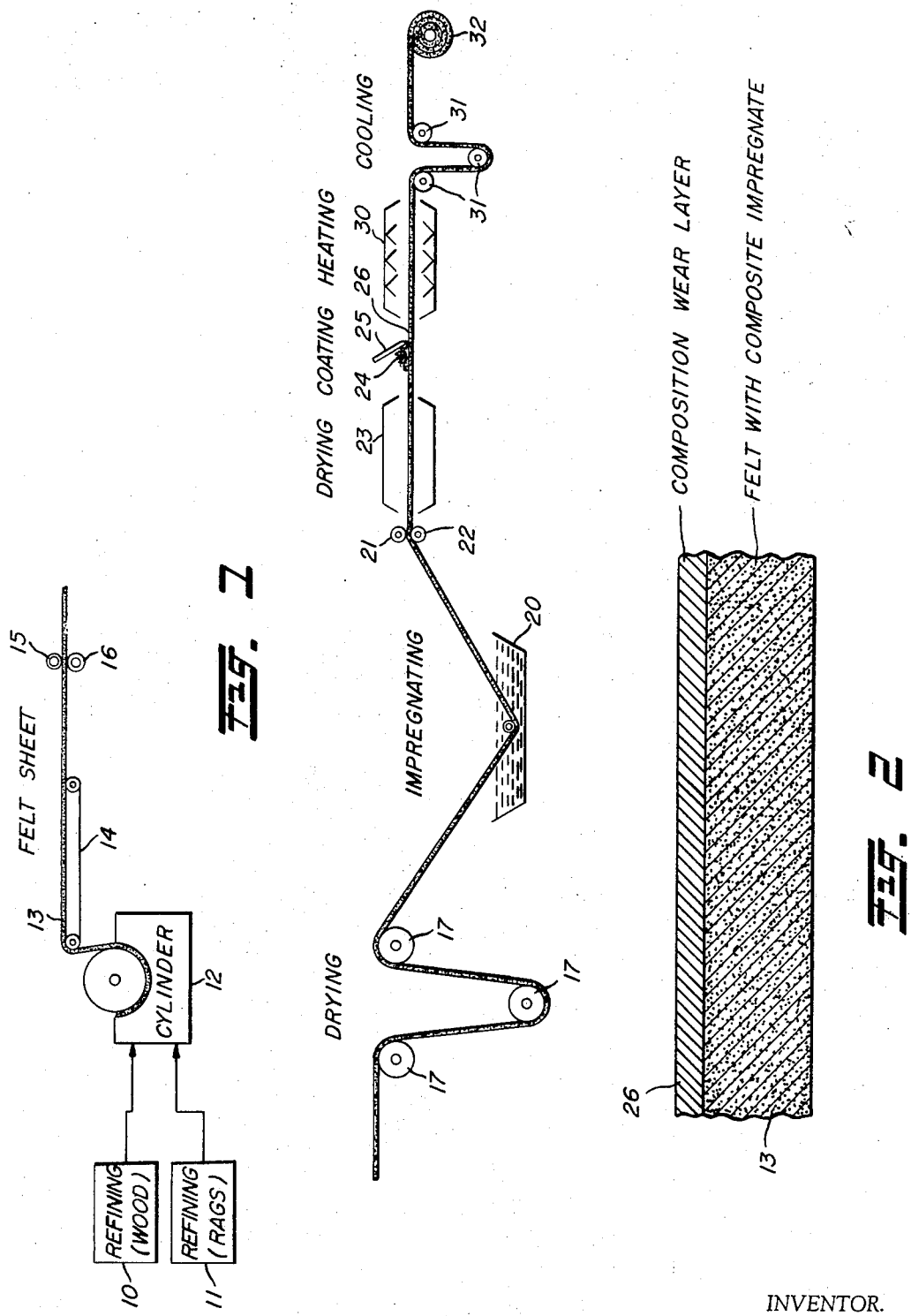

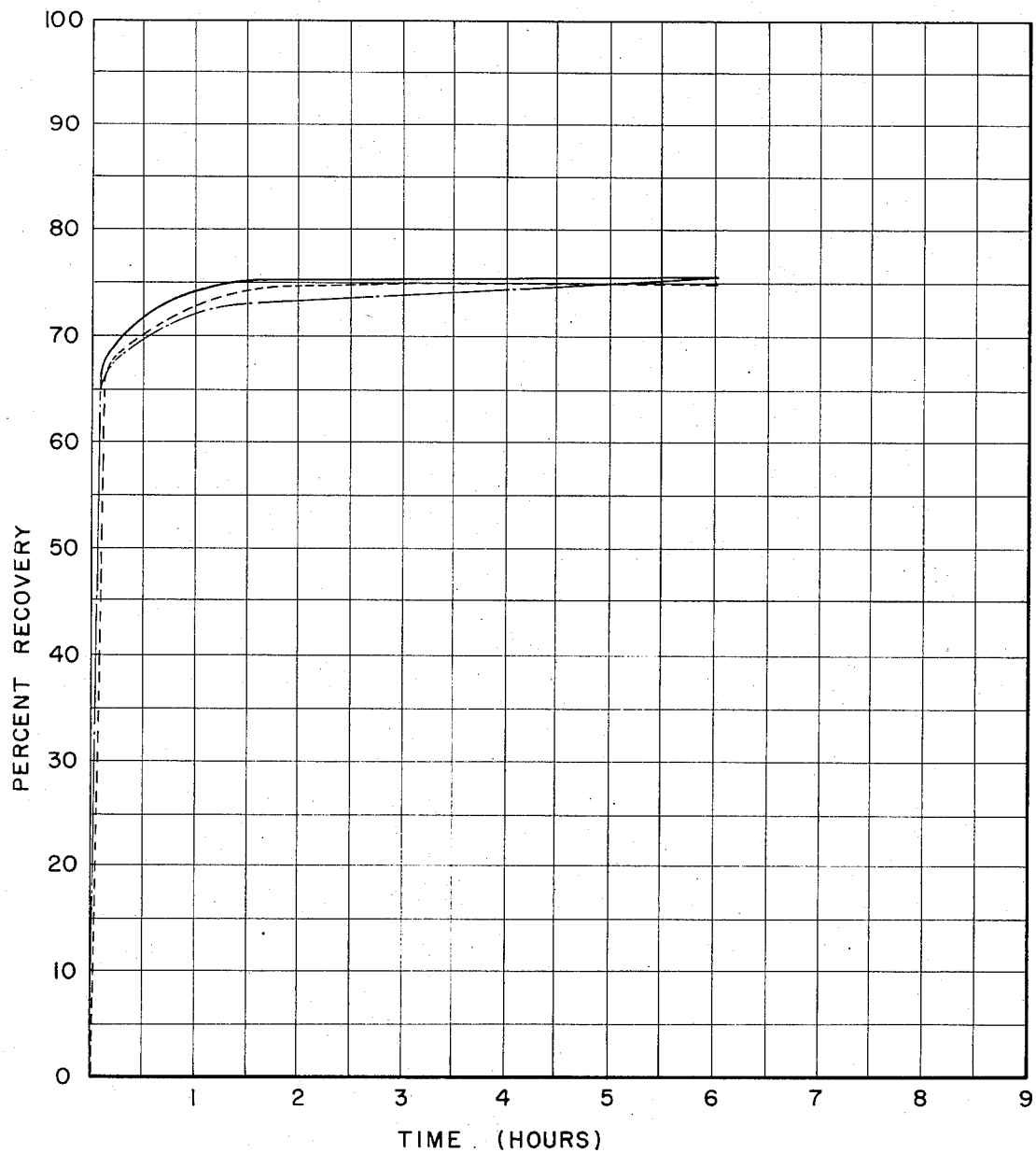

Leon B. Palmer, Little Falls, N.J., assignor to Congoleum Industries, Inc., Kearny, N.J.
Continuation-in-part of application Ser. No. 786,542, Dec. 6, 1968, which is a continuation-in-part of application Ser. No. 459,518, May 17, 1965, which in turn is a continuation-in-part of application Ser. No. 15,477, Mar. 16, 1960, all now abandoned. This application July 6, 1971, Ser. No. 159,768
Int. Cl. B32b 31/00; D06n 3/06
U.S. Cl. 8—115.6
6 Claims

ABSTRACT OF THE DISCLOSURE

This invention relates to a process for producing a surface covering having high indentation resistance and recovery from indentation and having in combination a resilient thermoplastic polyvinyl chloride composition wear-resistant surface layer having a thickness of at least 0.003 inch and a fibrous backing having a gauge-to-weight ratio of 0.8 to 1.2 and a thickness of from 0.025 to 0.060 inch which process comprises impregnating a protein-free cellulosic fibrous sheet with a uniformly dispersed resinous water-resistant and strengthening impregnant, incorporating within the cellulosic fibers of the fibrous sheet a difunctional, non-resinous, water-soluble reagent capable of cross-linking at least some of the hydroxy groups of the cellulosic fibers, and an acid catalyst, heating the fibrous sheet to cross-link at least some of the hydroxy groups, and applying a wear-resistant surface layer to the fibrous sheet, thereby crosslinking at least as many of the free hydroxyl groups as is necessary to provide at least about a 50% recovery within the 5 minute period from an indentation produced by applying a 100 pound load through a 0.75 inch spherical pin for 5 minutes to the surface covering. Also, the disclosure relates to the product produced in this manner.

CROSS REFERENCE TO RELATED APPLICATIONS

This application is a continuation-in-part of application Ser. No. 786,542, filed Dec. 6, 1968 now abandoned, which in turn is a continuation-in-part of application Ser. No. 459,518, filed May 17, 1965 now abandoned, which in turn is a continuation-in-part of application Ser. No. 15,477, filed Mar. 16, 1960, by Leon B. Palmer, entitled "Indent Resistant Felt," now abandoned.

BACKGROUND OF THE INVENTION

This invention relates to smooth surface coverings for floors, walls and the like, and particularly to such coverings having felted fibrous backing sheets.

Composition surface coverings are formed of binders and fillers compounded to form a uniform mass. The most common binders are oleoresinous material, i.e., linoleum, and synthetic resins, i.e., vinyl tile. It is not unusual for such products to having a backing material. The most widely used backing materials are fibrous felts because of their low cost. Felts of this type are formed from relatively short fibers and have a gauge-to-weight ratio of slightly greater than paper. Such felts are clearly distinguishable from fabrics and non-woven fabrics which have a very high gauge-to-weight ratio of well over 1.5. In the case of linoleum, the felt is used to hold the product together during processing until the oleoresinous binder has cured sufficiently to develop sufficient strength of its own. In the case of synthetic resins, felt backings allow the utilization of thinner wear layers and, therefore, a lower cost product. Although felt has many advantages, it has one glaring disadvantage in that it has poor dent resistance. The composition wear layers are generally tough resilient materials which have a high resistance to indentation. Their utilization with a felt backing, however greatly reduces the indent resistance. The reason for this is obvious when it is considered that when a load is placed on the composition layer, it is transferred through the layer to the felt. The felt having poor recovery retains the load impression and because of the plastic nature of the composition layer, it follows the indent thereby reflecting it in the surface of the product. It is apparent that this indent resistance of the felt can be greatly improved by saturating the felt with high percentages of resinous material similar to those used in the composition layer. Although this heavy saturation results in a better product, it also increases the cost to a point approaching the cost of the wear layer which defeats the purpose of the felt back. Increasing the amount of many of the commonly used saturants, however, does not increase the indent resistant of the product.

Felt alone as it is obtained from a paper machine has little usefulness as a backing due to its low strength and poor moisture resistance. It is conventional that felt backing sheets be impregnated to render them water resistant to provide the necessary tensile strength in the plane of the felt. Such felt sheets, however, can be easily broken by bending and no not have any crease resistance.

Considerable effort has been expended by workers in the field to discover an impregnant for felt which will have indent recovery. A rubber impregnant theoretically should be the best saturant because of its resilient nature. However, because of the low quantities of impregnants which have to be used from a cost standpoint, the resilient characteristic of rubber as an impregnant is lost.

SUMMARY OF THE INVENTION

An object of the invention is to provide a surface covering product which will have maximum recovery when subject to heavy loads.

Another object of the invention is to provide a fibrous backing sheet which can be used in the manufacture of a surface covering product which will not detract from the indent resistance of the composition wear layer.

Another object of the invention is to provide a fibrous backing sheet which can withstand high processing temperatures. Other objects and the advantages of the invention will appear hereinafter.

In accordance with the invention, a surface covering is provided having a resinous composition wear layer at least 0.003 inch in thickness and a sheet of felted cellulosic fibers bonded together by hydrogen bonds and having a gauge-to-weight ratio of from 0.8 to 1.2 as a backing containing a uniformly dispersed, water-insoluble resinous strengthening impregnant and a cured cellulose reactive reagent which is cross-linked to the hydroxy groups of the cellulose. The uncured cellulose reactive reagent is a water-soluble compound which is added with a catalyst to the felted cellulosic sheet as an aqueous solution and becomes absorbed into the fibers of the felt. After the sheet is dried, it can be heated to produce a cellulosic cross-linked product. This felt backing has remarkable resistance to indentation when used as a base for resinous composition floor covering. The reason for this result can only be theorized, but apparently the cross-linking of the cellulose fibers modifies the stress-strain properties of the fibers. The felt sheet does not have any of the normal crease-resistant properties which are obtained if a non-woven fabric was substituted for the felt sheet since it is readily broken by bending.

DESCRIPTION OF THE DRAWINGS

The invention will be better understood from the following detailed description when read in conjunction with the accompanying drawings which show one embodiment of the invention wherein:

FIG. 1 is a flow diagram of a method of preparing a felt backing sheet in accordance with the invention, and FIG. 2 is a cross-sectional representation of a surface covering prepared in accordance with the invention.

FIG. 3 is a graphical illustration of the percent of indentation recovery versus time utilizing the product of this invention.

DESCRIPTION OF THE PREFERRED EMBODIMENT

With reference to FIG. 1, a furnish of cellulose fibers is refined in the presence of large quantities of water in refining units 10 and 11. The fibers are then fed to a felt-forming machine 12 which picks up the fibers and deposits them in the form of a felt 13 on a moving screen 14 where much of the water is removed. Additional water is removed as the sheet passes between pressure rolls 15 and 16 and drying is completed by passage of the sheet over drying cans 17. The dried sheet which can contain as much as 25% or more moisture then passes through a tank 20 which contains the composite impregnant of the invention in an aqueous liquid. The liquid is removed by passing the impregnated felt between squeeze rolls 21 and 22 and thereafter into a drying oven 23. A wear layer of resinous composition 24 is then applied to the impregnated felt by any suitable means such as a doctor blade 25 which forms a smooth coating 26 of the composition on one surface of the felt. The coated sheet is then passed through a heater 30 to fuse the plastic composition. The sheet is then cooled by passing over cooling rolls 31 and wound in a collecting roll 32.

If it is desired to convert the cellulosic reactive reagent to its cured stage in the initial stage of processing, the drying oven 23, after removing the aqueous liquid from the sheet, heats the sheet to a high enough temperature to cause the reagent to react with free hydroxy groups of the cellulose fibers.

In the preferred embodiment of the invention, the reaction with the hydroxy groups of the cellulose does not take place until the composition wear layer has been applied. This subsequent reaction is highly desirable from a processing standpoint. The reaction of the cellulosic reactive reagent causes the felt to become relatively brittle and have a reduced tear strength. By delaying this conversion until a composition wear layer has been applied to its surface, the reduced tear and brittleness are largely overcome by the composition layer. This enables the use of substantially higher concentrations of cellulosic reactive reagent than believed possible since if the reaction took place prior to combining with a composition wear layer, in many instances, it would be too brittle and tear too easily to permit processing.

Numerous cellulosic fibrous materials are used as furnish to prepare fibrous sheets for use as backings or surface coverings. The sources of cellulose can include cotton, wood pulp, including both ground wood and chemical wood pulp, paper, boxes or mixtures thereof in any proportions. In addition, fillers such as wood flour can be used. It is preferred, however, to utilize an all-rag cotton furnish. Cellulosic fibers which contain as few as 1.8 free hydroxy groups per anhydro-glucose unit will result in sufficient cross-linkage for satisfactory results. The fibers are conventionally from $\frac{1}{16}''$ to $\frac{1}{2}''$ in length.

The furnish used for preparing the fibrous backing in accordance with the invention is broken up into short fibers and clusters of fibers in refining units such as Jordan mills, disc, hydraulic and rod mills. Jordan mills are most widely used. They consist of a horizontally positioned conical sheet within which rotates a cone-shaped plug. The clearance between the sheet and the plug governs the size of the fibers produced. The refining operation is conventionally carried out with a fiber content between 2% to about 4% and preferably about 3%, with the balance water. The felt sheet is formed from the aqueous suspension on a wire screen. In such an operation, the fibers are bonded together by hydrogen bonds as in paper sheets.

The fibrous backing sheet used for surface coverings is thicker and less dense than paper. The physical characteristics of the fibrous sheets are often measured and reported as the gauge-to-weight ratio which is $$\frac{\text{Thickness of felt (inches)}}{\text{Weight of 480 sq. ft. of felt (pounds)}} \times 1000$$

For floor covering felt, this ratio ranges from 0.9 to 1.2 and preferably from 0.85 to 1.05. Paper rarely has a gauge-to-weight ratio exceeding 0.75. When referring to the gauge-to-weight ratio of fibrous backing sheets, the weight is the weight of the fibers themselves, not including the impregnants present. The backing sheet produced normally has a thickness of between 0.015 inch and 0.080 inch and preferably between 0.025 and 0.060 inch. The water insoluble resinous strengthening impregnant and the cellulosic reactive reagent composition can be added to the felt at the same time or in separate operations.

Any of the conventionally used water-proofing and strengthening impregnants can be used. The type of impregnants used are resinous materials which can be classified as elastomeric thermoplastic, thermosetting or oleoresinous. The most widely used impregnant in the floor covering industry is asphalt. Asphalt, although being of relatively low cost, is a highly thermoplastic substance and will produce a product having substantially less indent resistance at similar saturation levels than some other impregnants. Other impregnants which can be used in place of asphalt are resinous materials which are water-resistant. Suitable resins include vinyl resins, such as polyvinyl chloride and polyvinyl acetate, mixtures of these with each other as well as copolymers, terpolymers and the like with other vinyl polymerizable vinyl components, such as acrylic and methacrylic acids and their polymerizable derivatives, polyethylene, polystyrene, butadiene-styrene copolymer, butadiene-acrylonitrile, natural rubber, polymerized chloroprene and the like. The oleoresins and the thermosetting resins are distinctive groups which cure by polymerization and cross-linking under the influence of heat. Such resins are alkyd resins, others are polyesters, epoxy, polyamides, isocyanates, drying oils semi-drying oils and the like. The amount of impregnant which can be added to a felt varies widely depending on the type of impregnant and the method of application. As an illustration, impregnation at high levels usually requires the addition of of the impregnant at a 100% solid content, i.e., no liquid carrier. The usual amount of impregnant is from about 5 to about 40% by weight based on the dry weight of the felt, although using an impregnant such as asphalt, the amount utilized can be as high as 140%. The preferred range of impregnant is 15% to 35%.

In order for the cellulose reactive reagent to be effective in accordance with the invention it is essential that the reagent be in its monomeric or unreacted state so that the molecule is small enough to penetrate the fibers making up the felt where under the influence of catalyst and heat, it will react chemically with the cellulosic material. The application of the reactive reagent by roll coater is not necessarily effective for accomplishing this result. It is highly desirable to pass the impregnated felt through squeeze rolls or similar pressure devices so that the reactive reagent is forced into the fibers and not merely retained on their surface. This procedure has the additional advantage that it reduces the amount of reactive reagent which must be added to the felt to produce the desired result.

The cellulose reactive reagent can be one type or a combination of different types. The reagent is a low molecular weight (less than 1000), non-resinous, water-soluble, difunctional, acid or acid salt catalyzed material which is thermoset in the presence of cellulose. The most available type of reactive reagents are the nitrogen bases chemically combined with formaldehyde or its chemical equivalent. The reactive groups of these compounds are N-methylol groups. Typical of these are condensation products of formaldehyde with urea, modified ureas, melamine, modified melamine and compounds derived therefrom such as dimethylol urea, trimethylol urea, dimethylol thiourea, trimethylol thiourea, alkoxymethyl urea, i.e., dimethoxymethyl urea, trimethoxymethyl urea, acetylene diurea formaldehyde, triazines, i.e., dimethylol melamine, trimethylol melamine, dimethylol benzoguanamine, trimethylol benzoguanamine, alkoxymethyl-melamines, i.e., pentamethoxymethyl melamine, monomethylated trimethyl-melamine, alkoxymethyl guanamines, ethylene, urons and triazones, i.e., dimethylol ethylene urea, dimethoxymethyl ethyleneurea, dimethylol dihydroxyethylene urea, tetramethylol glycoluril, dimethylol dimethylhydantoin, dimethylol uron, dimethoxymethyl uron, dimethylol methyltriazone, dimethylol ethyltriazone, dimethylol hydroxyethyl triazone, dimethylol ethylene bis-triazone, dimethylol propylene urea, dimethylol-5-hydroxy-propylene urea, dimethylol formamide, dimethylol adipamide, and dimethylol butanediol. In addition, other nitrogenous type reagents can be used which do not contain formaldehyde such as diisocyanates, i.e., tetramethylene diisocyanate, tetramethylene-bis-N,N-ethyleneurea, triaziridinyltriazine and tris(1-aziridinyl)phosphine oxide. Reactive reagents which do not contain nitrogen are also effective such as combinations of phenol and formaldehyde, i.e., 2,4,6-trimethylol phenol, ketone aldehydes, i.e., tetramethylol acetone, acetals, i.e., diethyleneglycol acetal, pentaerythritol acetal, and epoxides, i.e., ethyleneglycol diglycidyl ether. The amount of reactive reagent required will depend on the indent resistance desired. Usually amounts above 25% will not give any increased benefit. Use of amounts as low as 1% show a small improvement. It is preferred to use from about 5 to about 15% reactive reagent based on the dry weight of the felt.

It is essential to have a catalyst present to carry out the reaction. Acid-releasing catalysts are the most commonly used. Methylol ureas and methylol melamine reagents are best catalyzed by chloride and nitrate salts of hydroxyethyl amines such as monoethanol amine hydrochloride and 2-amino-2-methyl-propanol nitrate. Cyclic ethylene urea reagents, acetylene diurea formaldehyde and the uron reagents are preferably catalyzed by zinc nitrate or magnesium chloride. The epoxy reagents are preferably catalyzed by acid fluoride salts. The catalyst must be able to furnish hydrogen ions which are necessary for the condensation or etherification reaction taking place during the curing cycle. Usually from about 2% to 15% active catalyst based on reactive reagent solids is sufficient.

The wear-resistant composition layer applied to the felt produced according to the invention can be any of the conventionally used compositions for surface coverings. For example, a linoleum composition comprising a drying or semi-drying oil can be used. Alternately, a thermoplastic resinous composition can be used. Suitable compositions are, for example, polyvinyl chloride, polyvinyl acetate, vinylidene chloride and copolymers and mixtures of such resins. In like manner, rubber compositions of natural and synthetic origin can be used. Typical synthetic rubbers are butadiene and its copolymers with other vinyl compounds. The wear-resistant composition is applied either in the form of a preformed sheet or directly formed on the felt, such as by a coating operation or a calendering operation. The wear layer is usually from about 0.003 to about 0.050 inch thick and preferably from about 0.003 to about 0.030 inch thick.

If in accordance with the preferred embodiment of the invention the reactive reagent is maintained in its unreacted form until the application of the wear layer composition, it is then necessary to heat the composition sheet until sufficiently high temperature is reached to cure the reagent by reacting with the hydroxy group of the cellulose and convert it to its thermoset condition. This heating step can conveniently take place during the conventional processing of the floor covering. As an illustration of this in producing one type of floor covering, the coating of vinyl resin is applied to the surface of the felt after decorating by rotogravure printing or the like and thereafter the coating is heated to fuse the resin. This heating can likewise serve to react the reagent with the cellulose. In case of certain wear layers, such as linoleum, the composition does not have sufficient resistance at initial formation to prevent deterioration by the heat necessary to convert the reactive reagent. Typical of this type of composition is linoleum. It is therefore necessary to cure the composition or otherwise process it until it has sufficient resistance to withstand the temperatures necessary to catalyze the conversion of the reactive reagent. In order for the reagent to react with the cellulose, it is usually necessary to heat to at least 280° F. and preferably from about 320° F. to about 390° F. The reaction usually is complete in about one-half to ten minutes.

Although, as indicated above, a large variety of combinations can be used, a markedly superior composite impregnant from both the efficiency and cost standpoint is a combination of synthetic rubber, with a dimethylol ethyleneurea monomer.

The following examples are given for purposes of illustration:

Example I

A 12% aqueous solution of dimethylol ethylene urea cellulose reactive reagent (Rhonite R-1, manufactured by Rohm & Haas Co., Philadelphia, Pa.) is mixed with 1.5% of an aqueous solution (35% solids) of a zinc nitrate complex acid catalyst (pH 3.9–4.2) and the composite mixture is applied to a 0.043 inch thick all-rag felt having a gauge-to-weight ratio of 0.93 by dipping and squeezing. The amount of reagent picked up by the felt is 13% based on the weight of the dry felt. The felt was then dried and cured for two minutes at 395° F. Residual dent of the product is 0.010 inch (twenty-four hour test).

Example II

An aqueous solution containing 25% solids of an impregnant is prepared containing 1 part dimethylol ethylene urea cellulose reactive reagent solids (Rhonite R-1, manufactured by Rohm & Haas Co.), 1.5 parts of polyvinyl acetate resin solids and 0.1 part of a zinc nitrate complex acid catalyst. This solution is applied to an all-rag felt of approximately 0.043 inch in thickness having a gauge-to-weight ratio of 0.93. The amount of composite impregnant picked up by the felt is approximately 34%. The impregnated felt is then dried and cured for two minutes at 395° F. Residual dent of the product is 0.004 inch (Twenty-four hour test).

Example III

A composite impregnating composition having the following components is prepared:

| | Parts |
|---|---|
| Acetal cellulose reactive reagent 50% solids (Quaker Reactant 70, manufactured by Quaker Chemical Products Corp., Conshohocken, Pa.) | 110 |
| Butadiene-styrene resin (40/60) 47.8% solids (manufactured by Goodyear Tire & Rubber Co., Akron, Ohio) | 230 |
| Zinc complex acid catalyst 35% solids Catalyst H-7, (manufactured by Rohm & Haas Co.) | 20 |
| Water | 630 |
| Emulsion stabilizer (25%) | 10 |

A 0.043 inch thick all-rag felt having a gauge-to-weight ratio of 0.93 is impregnated with the above composition by dripping and squeezing. The amount of impregnant picked up by the felt is 32.2% after drying (about 11% reactive reagent). The dried felt is coated with 12-mil layer of polyvinyl chloride plastisol and the sample heated for two minutes at 395° F. The residual dent of the product is 0.012 inch (twenty-four hour test).

Example IV

A composite impregnating composition having the following components is prepared:

| | Parts |
|---|---|
| Triazine formaldehyde reagent 50% solids (Aerotex 23, manufactured by American Cyanamid Co., New York, N.Y.) | 110 |
| Butadiene-styrene resin (40/60) 48% solids (Pliolite 140, manufactured by Goodyear Tire and Rubber Co.) | 229 |
| Catalyst (zinc nitrate) | 22 |
| Emulsion stabilizer (25%) | 10 |
| Water | 625 |

A 0.05 inch thick all-rag felt having a gauge-to-weight ratio of 0.96 is impregnated with the above composition by dipping and squeezing. The amount of impregnant picked up by the felt is 32.2% after drying (about 11% reactive reagent). The dried felt is coated with 12-mil layer of polyvinyl chloride plastisol and the sample heated for two minutes at 395° F. The residual dent of the product is 0.010 inch (twenty-four hour test).

Example V

A composite impregnating composition having the following components is prepared:

| | Parts |
|---|---|
| Dimethylolurea reagent 47% solids (CSI Paste, manufactured by Onyx Oil & Chemical Co., Inc. Jersey City, N.J.) | 117 |
| Ammonium lactate (catalyst) | 14 |
| Butadiene-styrene (40/60) 48% solids (Pliolite 140) | 229 |
| Water | 630 |
| Emulsion stabilizer (25%) | 10 |

A .043 inch thick all-rag felt having a gauge-to-weight ratio of 0.93 is impregnated with the above composition by dipping and squeezing. The amount of impregnant picked up by the felt is 29% after drying (about 10% reactive reagent). The dried felt is coated with a 12-mil layer of polyvinyl chloride plastisol and the sample heated for two minutes at 395° F. The residual dent of the product is 0.0136 inch (twenty-four hour test).

Example VI

A composite impregnating composition having the following components is prepared:

| | Parts |
|---|---|
| Methylated trimethylolmelamine 80% solids (Aerotex M-3, manufactured by American Cyanamid Co.) | 69 |
| Butadiene-styrene resin (40/60) 48% solids (Pliolite 140) | 229 |
| Catalyst (zinc nitrate) | 20 |
| Emulsion stabilizer (25%) | 10 |
| Water | 672 |

A 0.047 inch thick all-rag felt having a gauge-to-weight ratio of 0.96 is impregnated with the above composition by dipping and squeezing. The amount of impregnant picked up by the felt is 29% after drying (about 10% reactive reagent). The dried felt is coated with a 12-mil layer of polyvinyl chloride plastisol and the sample heated for two minutes at 395° F. The residual dent of the product is 0.0094 inch (twenty-four hour test).

Example VII

A composite impregnating composition having the following components is prepared:

| | Parts |
|---|---|
| Acetylene diurea reagent [1] 50% solids (stabilizer N, manufactured by Onyx Oil and Chemical Co., Inc.) | 86 |
| Butadiene-styrene resin (40/60) 48% solids (Pliolite 140) | 229 |
| Emulsion stabilizer (25%) | 10 |
| Water | 675 |

[1] Tetramethylol acetylene diurea.

A 0.045 inch thick all-rag felt having a gauge-to-weight ratio of 0.94 is impregnated with the above composition by dipping and squeezing. The amount of impregnant picked up by the felt is 27% after drying (about 9% reactive reagent). The dried felt is coated with a 12-mil layer of polyvinyl chloride plastisol and the sample heated for two minutes at 395° F. The residual dent of the product is 0.0120 inch (twenty-four hour test).

Example VIII

A composite impregnating composition having the following components is prepared:

| | Parts |
|---|---|
| Triazone formaldehyde reagent 50% solids (Rhonite D-12, manufactured by Rohm & Haas Co.) | 160 |
| Butadiene-styrene resin (40/60) 50% solids | 320 |
| Catalyst (zinc nitrate) | 15 |
| Emulsion stabilizer (100%) | 2.5 |
| Water | 520 |

A 0.043 inch thick all-rag felt having a gauge-to-weight ratio of 0.93 is impregnated with the above composition by dipping and squeezing. The amount of impregnant picked up by the felt is 31% after drying. The dried felt is coated with a 12-mil layer of polyvinyl chloride plastisol and the sample heated for two minutes at 395° F. The residual dent of the product is 0.0082 inch (twenty-four hour test).

Example IX

A composite impregnating composition having the following components is prepared:

| | Parts |
|---|---|
| Triazone formaldehyde reagent 50% solids (Rhonite D-12, manufactured by Rohm & Haas Co.) | 160 |
| Acrylic resin 46% solids (Rhoplex B-15, manufactured by Rohm & Haas Co.) | 435 |
| Catalyst (zinc nitrate) | 9 |
| Emulsion stabilizer (100%) | 2.5 |
| Water | 396 |

A 0.045 inch thick all-rag felt having a gauge-to-weight ratio of 0.94 is impregnated with the above composition by dipping and squeezing. The amount of impregnant picked up by the felt is 36% after drying (about 12% reactive reagent). The dried felt is coated with a 12-mil layer of polyvinyl chloride plastisol and the sample heated for two minutes at 395° F. The residual dent of the product is 0.0074 inch (twenty-four hour test).

Example X

A composite impregnating composition having the following components is prepared:

| | Parts |
|---|---|
| Dimethylol ethyleneurea reagent 50% solids (Rhonite R-1) | 160 |
| Butyl rubber latex 55% | 132 |
| Acrylic resin latex 46% (Rhoplex B-15) | 217 |
| Catalyst (zinc nitrate) | 15 |
| Water | 442 |
| Emulsion stabilizer (100%) | 2.5 |

A 0.043 inch thick all-rag felt having a gauge-to-weight ratio of 0.93 is impregnated with the above composition by dipping and squeezing. The amount of impregnant picked up by the felt is 35% after drying (about 12% reactive reagent). The dried felt is coated with a 12-mil layer of polyvinyl chloride plastisol and the sample heated for two minutes at 395° F. The residual dent of the product is 0.0085 inch (twenty-four hour test).

Example XI

A composite impregnating composition having the following components is prepared:

| | Parts |
|---|---|
| Dimethylol ethylene urea (Rhonite R-1) | 127 |
| Butadiene-styrene (40/60) (Butaprene FL23, manufactured by Firestone Tire & Rubber Co., Akron, Ohio) 48% solids | 264 |
| Catalyst (zinc complex) | 20 |
| Emulsion stabilizer (alkylaryl polyether alcohol) | 2.5 |
| Water | 576 |

A .047 inch thick all-cotton felt having a gauge-to-weight ratio of 0.96 is impregnated with the above composition by roll coater application. The amount of impregnant picked up by the felt is 35% after drying (about 13% reactive reagent). The dried felt is coated with a 12-mil layer of polyvinyl chloride plastisol and the sample heated for two minutes at 395° F. The residual dent of the product is 0.0075 inch (twenty-four hour test).

Table A shows the indent resistance of various combinations of impregnants in an all-rag felt having a thickness of 0.043 inch and a gauge-to-weight ratio of 0.93 and a 0.012 inch thick coating of polyvinyl chloride plastisol on its surface.

the 24 hour recovery occurs within 1 hour, illustrating the unusually high and unexpected resiliency characteristics of the crosslinked felt base product. The percentage recovery varies to some extent with the particular reactive reagent used as well as the resinous impregnant, however, all of the crosslinking reagents will provide at least a 50% recovery within 5 minutes, and as high as 75% recovery within 24 hours.

TABLE B

| | Example number | | | | | |
|---|---|---|---|---|---|---|
| | 20 | | 21 | | 22 | |
| | Inch | Percent recovery | Inch | Percent recovery | Inch | Percent recovery |
| Original thickness | .0380 | | .0395 | | .0396 | |
| Thickness after 5 min. load | .0142 | | .0144 | | .0149 | |
| Depth of dent after 5 min. load | .0238 | | .0251 | | .0247 | |
| Dent recovery after— | | | | | | |
| 5 min | .0158 | 66.3 | .0166 | 66.1 | .0167 | 67.5 |
| 30 min | .0161 | 67.6 | .0176 | 70.1 | .0179 | 72.5 |
| 1 hour | .0173 | 72.7 | .0180 | 71.7 | .0181 | 73.3 |
| 3 hours | .0178 | 74.8 | .0185 | 73.7 | .0186 | 75.2 |
| 6 hours | .0178 | 74.8 | .0189 | 75.3 | .0187 | 75.7 |
| 24 hours | .0180 | 75.6 | .0191 | 76.1 | .0189 | 76.5 |

While this invention has been described, it will be understood that it is capable of further modification, and this application is intended to cover any variations, uses and/or adaptations of the invention following in general, the principle of the invention and including such departures

TABLE A

| Example number | Strengthening impregnant [3] | Reactive reagent, percent [2] | | | | | | | | | | | | | |
|---|---|---|---|---|---|---|---|---|---|---|---|---|---|---|---|
| | | 0 | 1 | 2 | 3 | 5 | 6 | 7 | 8 | 9 | 10 | 11 | 12 | 15 | 17 | 19 |
| | | Twenty-four hour residual depth of dent (inches) [1] | | | | | | | | | | | | | | |
| 12 | None | 0.019 | | | | 0.017 | | | | | 0.0125 | | 0.010 | 0.009 | | |
| 13 | Asphalt [4] | 0.019 | | | | | | | | | 0.009 | | | | | |
| 14 | Polyvinyl acetate resin | 0.020 | 0.017 | 0.0135 | | 0.0115 | | | | | 0.008 | | | | | |
| 15 | Polyvinyl chloride resin | 0.016 | | | | | | | | | 0.009 | | | | | |
| 16 | Butyl rubber | 0.022 | | | | 0.015 | | | | 0.0145 | 0.011 | 0.0075 | | | | |
| 17 | Acrylic resin | 0.017 | | | 0.014 | 0.010 | | 0.009 | | 0.008 | 0.008 | | | | | |
| 18 | Butadiene-styrene (40/60) | 0.020 | | | | 0.011 | | | | 0.009 | | 0.01 | | 0.009 | 0.008 | |
| 19 | do | | | | | | 0.012 | | | | | | | | | |

[1] Determined as follows: A 100-lb. load is applied to a ¾ inch steel sphere on the test sample for five minutes. The load is removed and the depth of residual dent is measured after 24 hours. (Sample conditioned for 20 hours at 75° F., 50% relative humidity prior to test and these conditions were held throughout the test.)
[2] Parts of reagent per 100 parts dry felt.
[3] Total of strengthening impregnant and cellulose reactive reagent is 30% by weight of dry felt.
[4] Total of strengthennig impregnant and cellulose reactive reagent is 95% by weight of dry felt.

NOTE.—For Examples 13 to 18 the cellulose reactive reagent is dimethylol ethyleneurea for Example 19 the reagent is an acetal.

Examples XX, XXI, XXII

The following table illustrates the percentage recovery attained in the finished product utilizing the process of this invention. The percentage recovery was determined by applying a 100 lb. load to a 0.75 inch steel sphere on the test sample for 5 minutes. The initial dent is measured, the load is removed and the residual dent is measured after 5 minutes, 30 minutes, 1 hour, 3 hours, 6 hours and 24 hours. The samples of the felt were 0.038 inch gauge felt and contained the following percentages of dry saturant based on the weight of the dry felt:

| | Percent |
|---|---|
| Dimethyloldihydroxyethylene urea reactive reagent | 10 |
| Butadiene-styrene copolymer resin strengthening impregnant | 20 |
| Zinc nitrate complex acid catalyst (35% solids in water) | 1.5 |

The samples were cured for 2 minutes at 400° F. to crosslink the cellulosic fibers, and the felt was then cooled and conditioned for 24 hours at 73° F. and 50% relative humidity prior to the testing.

Table B shows the results of the testing, and these results are illustrated graphically at FIG. 3. As can be readily seen from FIG. 3, the crosslinked felt shows more than 70% recovery within 1 hour, and more than 90% of from the present disclosure as come within known or customary practice in the art to which the invention pertains, and as may be applied to the essential features hereinbefore set forth, as fall within the scope of the invention or the limits of the appended claims.

What is claimed is:

1. A process for producing a resilient surface covering having high indentation recovery and having in combination a resilient thermoplastic plasticized polyvinyl chloride composition wear resistant surface layer and a protein free cellulosic fibrous felt backing sheet which comprises:

(a) impregnating a protein free cellulosic fibrous felt backing sheet having a gauge-to-weight ratio of 0.8 to 1.2 and a thickness of from 0.025 to 0.060 inch and containing at least 1.8 hydroxy groups per anhydroglucose unit with about 5–40% of the dry weight of the felt of a uniformly dispersed resinous water resistant and strengthening impregnant, selected from the group consisting of resinuous compounds of asphalt, polyvinyl halides, polyvinyl acetate, polymers of acrylic and methacrylic acids, polyethylene, polystyrene, butadiene-acrylonitrile copolymers, butadiene-styrene copolymers, natural rubber, butyl rubber, polymerized chloroprene, alkyd resins, polyurethane resins, drying oils and semi-drying oils, (b) incorporating within the cellulosic fibers of the fibrous felt backing sheet about 5–15% of a di-functional, water soluble reagent having a molecular weight of less than 1000 and capable of cross-linking at least some of said hydroxy groups and selected from the group consisting of N-methylol derivatives of urea, triazine, triazone and uron, N-alkoxymethylated derivatives of triazine and uron, and acetals and epoxides and and an acid catalyst, (c) heating said fibrous felt backing sheet to a temperature of at least 280° F. for a period of from about one-half to about ten minutes to cross-link at least some of said hydroxy groups, (d) applying the wear resistant surface layer having a thickness of about 0.003 inch to 0.050 inch to the fibrous felt backing sheet, (e) wherein the di-functional reagent cross-links at least as many of the free hydroxy groups in the fibers of the cellulosic fibrous felt backing sheet as is necessary to provide at least about a 50% recovery within a five minute period from an indentation produced by applying a 100 pound load through a 0.75 inch spherical pin for five minutes to the surface covering.

2. A process as in claim 1 and wherein:
the heating step takes place after the application of the wear layer for substantially simultaneously cross-linking the cellulosic fibers and curing the wear resistant layer.

3. A process as in claim 2 and wherein:
said heating step comprises heating the fibrous felt backing sheet to a temperature of from about 380° F. to about 410° F. for about two minutes.

4. A process as in claim 1 and wherein:
the di-functional reagent crosslinks at least as many of the free hydroxy groups as is necessary to provide at least a 65% recovery within a five minute period from an indentation produced by applying a one hundred pound load through a 0.75 inch spherical pin for five minutes to the surface covering.

5. The process of claim 4 wherein:
said acid catalyst is selected from the group consisting of zinc nitrate and ammonium lactate and is present in from about 2% to about 15% by weight based on the weight of the reagent, and
said reagent is selected from the group consisting of dimethylol dihydroxy ethylene urea and dimethylol ethylene urea.

6. The product produced by the process of claim 1.

References Cited
UNITED STATES PATENTS

| | | | |
|---|---|---|---|
| 2,819,754 | 1/1958 | Feigley | 8—115.6 |
| 3,019,134 | 1/1962 | Hechtman et al. | 117—155 UA |
| 2,985,501 | 5/1961 | Gagarine | 8—120 |
| 2,322,888 | 6/1943 | Schwartz | 8—116.3 X |
| 2,968,581 | 1/1961 | Kress | 117—139.5 |
| 2,785,995 | 1/1957 | Kress | 117—118 |
| 2,441,859 | 5/1948 | Weisberg et al. | 8—116.4 |

OTHER REFERENCES

Tovey: Textile Research Journal, March 1961, pp. 202–206.

Reid et al.: Modern Textiles Magazine, March 1958, pp. 61–65.

LEON D. ROSDOL, Primary Examiner

H. WOLMAN, Assistant Examiner

U.S. Cl. X.R.

8—120; 117—76 FB, 118, 140 A, 161 A